(12) United States Patent
Mays (10) Patent No.: US 7,646,836 B1
(45) Date of Patent: Jan. 12, 2010

(54) DYNAMIC CLOCK RATE MATCHING ACROSS AN ASYNCHRONOUS NETWORK

(75) Inventor: Russell Mays, Stockton, CA (US)

(73) Assignee: Network Equipment Technologies, Inc., Fremont, CA (US)

( * ) Notice: Subject to any disclaimer, the term of this patent is extended or adjusted under 35 U.S.C. 154(b) by 562 days.

(21) Appl. No.: 11/153,654

(22) Filed: Jun. 14, 2005

Related U.S. Application Data (60) Provisional application No. 60/657,991, filed on Mar. 1, 2005.

(51) Int. Cl.
*H04L 7/00* (2006.01)
(52) U.S. Cl. ............... 375/354; 375/371; 375/372; 375/373; 375/374; 375/375; 375/376
(58) Field of Classification Search ......... 375/354, 375/371–376
See application file for complete search history.

(56) References Cited

U.S. PATENT DOCUMENTS

| | | | | |
|---|---|---|---|---|
| 3,754,098 A * | 8/1973 | Abramson et al. | ......... | 375/371 |
| 4,759,041 A * | 7/1988 | Anderson et al. | ......... | 375/371 |
| 4,811,340 A * | 3/1989 | McEachern et al. | ......... | 370/505 |
| 5,053,983 A * | 10/1991 | Hyatt | ......... | 708/306 |
| 5,263,057 A * | 11/1993 | Nawrocki et al. | ......... | 375/372 |
| 5,272,728 A * | 12/1993 | Ogawa | ......... | 375/372 |
| 5,396,492 A * | 3/1995 | Lien | ......... | 370/412 |
| 5,452,010 A * | 9/1995 | Doornink | ......... | 348/497 |
| 5,526,362 A * | 6/1996 | Thompson et al. | ......... | 370/516 |
| 5,790,538 A * | 8/1998 | Sugar | ......... | 370/352 |
| 5,844,891 A * | 12/1998 | Cox | ......... | 370/395.62 |
| 5,995,570 A * | 11/1999 | Onvural et al. | ......... | 375/356 |
| 6,055,231 A * | 4/2000 | Mesecher et al. | ......... | 370/342 |
| 6,088,413 A * | 7/2000 | Autry et al. | ......... | 375/372 |
| 6,111,878 A * | 8/2000 | Powell | ......... | 370/395.62 |
| 6,141,671 A * | 10/2000 | Adams et al. | ......... | 708/313 |
| 6,157,957 A * | 12/2000 | Berthaud | ......... | 709/248 |
| 6,252,850 B1 * | 6/2001 | Lauret | ......... | 370/235 |
| 6,259,677 B1 * | 7/2001 | Jain | ......... | 370/252 |
| 6,263,036 B1 * | 7/2001 | Yamamoto et al. | ......... | 375/372 |
| 6,400,683 B1 * | 6/2002 | Jay et al. | ......... | 370/229 |
| 6,415,006 B2 * | 7/2002 | Rude | ......... | 375/372 |
| 6,574,246 B1 * | 6/2003 | Crosby | ......... | 370/516 |
| 6,594,329 B1 * | 7/2003 | Susnow | ......... | 375/372 |
| 6,606,360 B1 * | 8/2003 | Dunning et al. | ......... | 375/354 |
| 6,622,183 B1 * | 9/2003 | Holm | ......... | 710/34 |
| 6,643,345 B1 * | 11/2003 | Inoue et al. | ......... | 375/372 |
| 6,711,227 B1 * | 3/2004 | Kaylani et al. | ......... | 375/372 |
| 6,721,328 B1 * | 4/2004 | Nichols et al. | ......... | 370/395.62 |
| 6,760,395 B1 * | 7/2004 | Bonello et al. | ......... | 375/376 |
| 6,819,727 B1 * | 11/2004 | Cucchi et al. | ......... | 375/372 |
| 6,882,662 B2 * | 4/2005 | Subrahmanyan et al. | ..... | 370/506 |
| 6,982,993 B1 * | 1/2006 | Claveloux et al. | ......... | 370/503 |
| 7,042,911 B2 * | 5/2006 | Toshitani | ......... | 370/503 |
| 7,058,069 B2 * | 6/2006 | Itai | ......... | 370/412 |
| 7,133,485 B1 * | 11/2006 | Baird et al. | ......... | 375/376 |

(Continued)

*Primary Examiner*—Jason M. Perilla
(74) *Attorney, Agent, or Firm*—Townsend and Townsend and Crew (57) ABSTRACT

Techniques are provided for calculating a clock rate for a serial clock of a transmitter where information sent by the transmitter is sent in packets from the transmitter over an asynchronous network. The techniques involve minimizing the number of adjustments to the clock rate that are needed to fine tune the clock rate to match the serial clock of the transmitter.

15 Claims, 6 Drawing Sheets

U.S. PATENT DOCUMENTS

| | | | |
|---|---|---|---|
| 7,177,611 B2 * | 2/2007 | Goldman | 455/260 |
| 7,254,207 B2 * | 8/2007 | Bleisteiner et al. | 375/372 |
| 2002/0001359 A1 * | 1/2002 | Skierszkan et al. | 375/355 |
| 2002/0015460 A1 * | 2/2002 | Bhullar et al. | 375/371 |
| 2002/0075980 A1 * | 6/2002 | Tang et al. | 375/372 |
| 2002/0191724 A1 * | 12/2002 | Bleisteiner et al. | 375/372 |
| 2003/0021371 A1 * | 1/2003 | He | 375/376 |
| 2003/0053578 A1 * | 3/2003 | Hinck et al. | 375/376 |
| 2004/0258099 A1 * | 12/2004 | Scott et al. | 370/503 |
| 2005/0207480 A1 * | 9/2005 | Norsworthy et al. | 375/219 |
| 2005/0220240 A1 * | 10/2005 | Lesso | 375/372 |
| 2006/0146884 A1 * | 7/2006 | Skerritt | 370/503 |

* cited by examiner

DYNAMIC CLOCK RATE MATCHING ACROSS AN ASYNCHRONOUS NETWORK

CROSS-REFERENCES TO RELATED APPLICATIONS

The present application is a non-provisional of and claims priority from U.S. Provisional Application No. 60/657,991 filed Mar. 1, 2005; the entire contents of which is herein incorporated by reference for all purposes.

BACKGROUND OF THE INVENTION

The present invention generally relates to telecommunications and more specifically to dynamically adjusting an egress clock rate in order to match the clock rate of an ingress port across an asynchronous network.

In a network capable of transporting asynchronous data, a transmitter node may receive a serial bitstream from a local source, and send the data across the asynchronous network. The data is received at a receiver node. The receiver node stores the incoming data in a buffer.

The data is then arranged into a serial bitstream and played out to the local serial receiver. In playing out the serial bitstream, a clock is used to play the serial bitstream at a certain fixed rate. This clock should be the same rate as the clock used to send the packets at the sender end. The fixed rate, however, is not carried with the data. Accordingly, techniques are used to generate a clock that is similar to the rate used to send the data at the sender end. These techniques often attempt to match the sender rate based on the rate of a data received over of period of time. However, while traversing the network, jitter may be introduced. Accordingly, the data may arrive at the receiver node in varying intervals. Thus, the rate determined may jump around depending on the delay. Also, the rates determined may overshoot the actual rate. Thus, multiple rate determinations may be made that are either too slow or too fast, in an alternating fashion, are used as the clock rate. These determinations are disruptive and may cause the serial receiver to lose its lock because the serial receiver may be configured to receive data at a certain bit rate. Slight variations may be acceptable; however, rate changes in different directions may cause the receiver to lose its lock and errors are caused.

BRIEF SUMMARY OF THE INVENTION

The present invention generally relates to dynamically adjusting an egress clock rate in order to match the clock rate of an ingress port across an asynchronous network. In one embodiment, techniques are provided for calculating a clock rate for a serial clock of a transmitter where information sent by the transmitter is sent in packets from the transmitter over an asynchronous network. The techniques involve minimizing the number of adjustments to the clock rate that are needed to fine tune the clock rate to match the serial clock of the transmitter.

Data that is received over the asynchronous network is stored in a buffer. A seed rate is determined that represents an average clock frequency over a period of time. Low and high thresholds are determined in addition to an ideal depth. These thresholds and ideal depth represent levels in the buffer. If the high threshold or low threshold is exceeded, the seed frequency is adjusted with a first coarse frequency adjustment. This coarse adjustment is a drastic, but temporary, adjustment to the clock rate in order to prevent the buffer from over/underflowing. If the buffer over/underflows, it may cause data loss, and this is avoided by the drastic adjustment. After the buffer depth reaches the ideal depth, the seed rate is adjusted by a fine adjustment.

The fine adjustment is a smaller adjustment that tunes the seed rate to become more accurate, i.e., closer to the clock rate of the transmitter. In one embodiment, the buffer depth may increase/decrease towards the high threshold/low threshold again because the fine adjustment is smaller than an adjustment that may bring the seed rate closer to the serial clock frequency of the transmitter. The process described above is then performed again when the high threshold/low threshold is exceeded. This process is performed until the serial clock of the transmitter is determined.

Using the fine tuning, the depth of the buffer may change more slowly and it may be a longer time before the buffer thresholds are crossed again. Eventually, the seed rate may be assigned a value that accurately matches the serial clock of the transmitter. The above method avoids large adjustments that may overcompensate for adjustments to the serial clock.

In one embodiment, a method for calculating a clock rate for a serial clock of a transmitter is provided. The data from the transmitter is sent over an asynchronous network. The method comprises: (a) calculating a seed frequency over a period of time based on data sent from the transmitter over the period of time; (b) determining a high threshold, a low threshold, an ideal depth of a buffer, a coarse frequency adjustment value, and a fine frequency adjustment value based on the seed rate; (c) receiving data from the transmitter over the asynchronous network; (d) storing the data in the buffer; (e) determining if the level of the buffer exceeds the high threshold or low threshold; (f) if the high threshold or low threshold is exceeded, changing the seed rate by the coarse frequency adjustment; (g) determining when the buffer level reaches the ideal depth; (h) when the buffer level reaches the ideal depth, changing the seed rate by the fine frequency; and (i) performing steps (c-i) if the high or low threshold is exceeded again.

In another embodiment, a method for calculating a clock rate for a serial clock of a transmitter is provided. The data sent from the transmitter is sent over an asynchronous network. The method comprises: determining a seed frequency as an initial calculation of the clock rate of the serial clock; receiving data over the asynchronous network; storing the data in the buffer; monitoring the level of the buffer; when the level of the buffer exceeds a threshold in a first direction, changing the seed frequency by a first amount in order to cause the buffer level to exceed the threshold in a second direction; and adjusting the seed frequency by a second amount configured to allow for multiple adjustments to the seed frequency until the seed frequency is substantially similar to the clock rate of the serial clock, wherein the first amount is larger than the second amount.

In yet another embodiment, a method for calculating a clock rate for a serial clock of a transmitter is provided. The data for the transmitter is sent over an asynchronous network. The method comprises: providing a high threshold, a low threshold, an ideal depth of a buffer, a seed frequency, a coarse frequency adjustment value, and a fine frequency adjustment value; receiving data from the transmitter over the asynchronous network; storing the data in the buffer; monitoring the level of the buffer; determining if the level of the buffer exceeds the high threshold or low threshold; if the level of the buffer exceeds the high threshold, then performing the steps of: setting a first new seed frequency as the seed frequency plus the coarse frequency adjustment; when the level of the buffer reaches the ideal depth of the buffer, setting a second new seed frequency as the seed frequency plus the fine frequency adjustment, wherein the second new seed frequency is less than the first new seed frequency; if the level of the buffer exceeds the low threshold, then performing the steps of: setting a first seed frequency as the seed frequency minus the coarse frequency adjustment; when the level of the buffer reaches the ideal depth of the buffer, setting a second new seed frequency as the seed frequency minus the fine frequency adjustment, wherein the second new seed frequency is greater than the first new seed frequency A further understanding of the nature and the advantages of the inventions disclosed herein may be realized by reference of the remaining portions of the specification and the attached drawings.

DETAILED DESCRIPTION OF THE INVENTION

Figure 1:
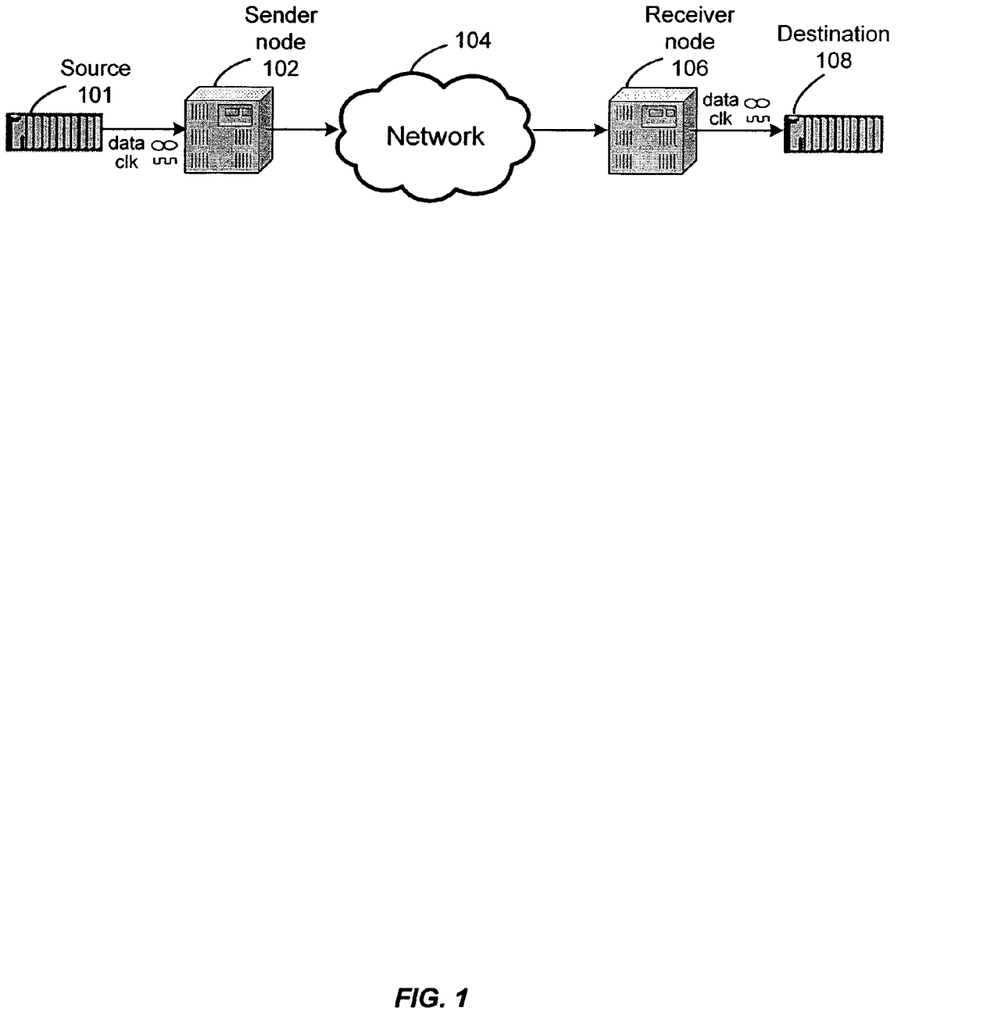
FIG. 1 depicts a system for determining a clock frequency according to one embodiment of the present invention.

FIG. 1 depicts a system 100 for determining a clock frequency according to one embodiment of the present invention. As shown, system 100 includes a source 101, a sender node 102, a network 104, a receiver node 106, and a destination 108. Serial information is sent from source 101 to sender node 102. Sender 102 sends the information through network 104 to receiver node 106. Receiver node 106 takes the information in the packets and sends the serial information to destination 108. Although source 101, sender node 102, receiver node 106, and destination 108 are shown, it will be understood that any number of sources 101, sender nodes 102, receiver nodes 106, and destinations 108 may be included in system 100. It will also be recognized that although system 100 is described as data flowing in one direction, system 100 may be full duplex.

The serial data sent may be any information. For example, the information may include information for a streaming video, streaming audio, etc.

Sender node 102 may be any telecommunication device configured to send the data. For example, sender node 102 may be a router, switch, customer premise equipment (CPE), computing device, access concentrator, TDM switch, packet switch, aggregation device, and the like.

Receiver node 106 may be any telecommunication device configured to receive the data. For example, receiver node 106 may be a router, switch, customer premise equipment (CPE), computing device, access concentrator, TDM switch, packet switch, aggregation device, and the like.

Network 104 may be any network capable of transporting asynchronous data. Asynchronous data may be data that is not sent at a continuous rate. In one embodiment, network 106 may be a time division multiplex (TDM) network that transports the data. The data is asynchronous in that a data valid signal is used to indicate when valid data is received. The signal is asserted and de-asserted depending on if valid data is received. This assertion and de-assertion causes the data to be received in an asynchronous manner.

In another embodiment, network 106 may be a packet-based network. For example, network 104 comprises a packet switched network. Packet switched networks are configured to send packets of data where some packets 108 in a communication may be sent through different paths. Accordingly, because packets 108 may be sent through different paths, packets 108 sent from a sender node 102 to a receiver node 106 may be received at receiver node 106 in different intervals from which they were sent.

Source 101 may be any telecommunication device configured to send data. For example, source 101 may be customer premise equipment, data communications equipment—DCE (modem), satellite link (High Level Data Link Control (HDLC)), telemetry equipment (global positioning systems (GPSs)), etc. Source 101 is configured to send serial data in a stream to sender node 102. In one embodiment, the data sent may be time division multiplex (TDM) data that is sent through a synchronous network from source 101 to sender node 102. In one embodiment, source 101 may be in a different clock domain from that of sender node 102. This means that a clock used to send serial data from source 101 to sender node 102 may be different from the clock used to send data from sender node 102 to receiver node 106.

Source 101 sends data in a serial bitstream to sender node 102. The bitstream is sent at a fixed rate X (in megabits per second). The bitstream is sent using a clock that outputs a frequency. The clock is referred to as the "ingress clock".

In one embodiment, the serial bitstream is sent asynchronously through network 106. The data may be sent through a TDM network in one embodiment. A data valid signal is used to assert when valid data is received. This signal may be asserted at varying intervals. Also, the data may be sent through a packet-based network. In this case, sender node 102 is configured to packetize the serial bitstream (i.e., chop the continuous stream into groups of bits), add packet headers/trailers, and send the packets across network 104. When traversing network 104, jitter or packet delay variations may be introduced to the packet stream. Accordingly, the packets may arrive at receiver node 106 at varying intervals and arrival times.

Receiver node 106 sends the data received in a synchronous manner to destination 108. The clock used to send the data from source 101 to sender node 102 should be used to send the serial data from receiver node 106 to destination 108. Accordingly, source 101 and destination 108 should be in the same clock domain. For example, data sent from source 101 and the data received at destination 108 should be sent/received using the same clock rate.

When data is sent through an asynchronous network, the ingress clock that was used to send data from source 101 may be unspecified. The ingress clock may also change dynamically. Thus, embodiments of the present invention are configured to determine the ingress clock used by source 101 to send the serial data. This clock rate will be referred to as the "ingress clock rate".

When data is received, the data is stored in a buffer. The data should be sent out of the buffer to destination 108 using an egress clock rate that is similar to the ingress clock rate. However, because the ingress clock rate is unspecified, the ingress clock rate needs to be determined. As will be described below, the egress clock rate is determined such that the buffer memory does not overflow or underflow, data is not lost or corrupted, and the jitter and wander of an egress clock rate is kept to a minimum so as to not affect the receiving of data at destination 108.

Figure 2:
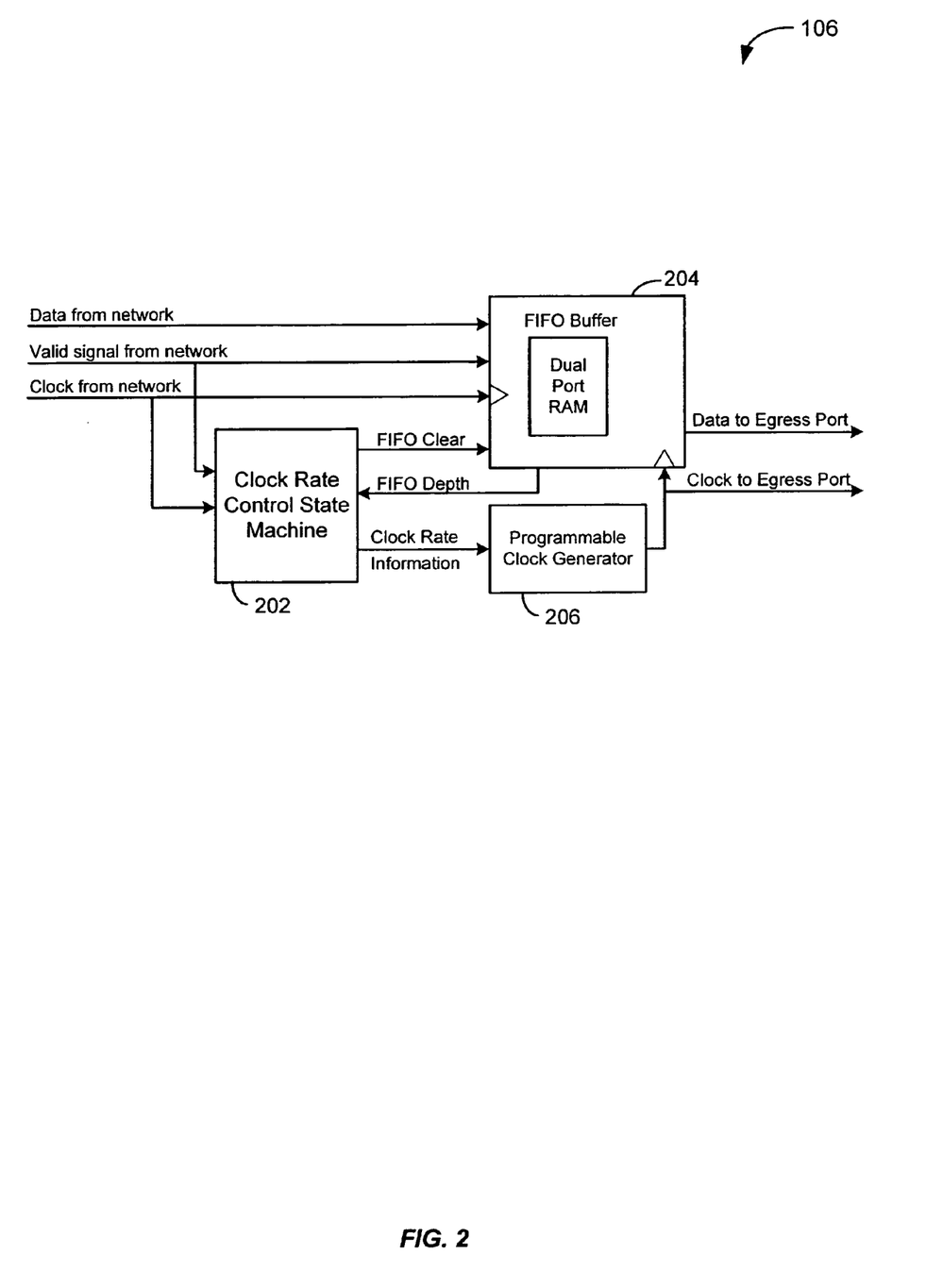
FIG. 2 depicts a more detailed embodiment of a receiver node according to embodiments of the present invention.

FIG. 2 depicts a more detailed embodiment of receiver node 106 according to embodiments of the present invention. As shown, receiver node 106 includes a clock rate control state machine 202, a buffer 204, and a programmable clock generator 206.

Programmable clock generator 206 is configured to generate a clock rate. Depending on the clock rate, at each clock cycle, data may be sent from buffer 204 to destination 108. In one embodiment, programmable clock generator 206 is described in U.S. patent application Ser. No. 11/153,039 "Baud Rate Generation Using Phase Lock Loops", filed concurrently, which is incorporated in its entirety for all purposes.

Buffer 204 may be any memory device configured to store data. For example, buffer 204 may be a first in/first out (FIFO) buffer. This may be implemented using a dual port random access memory (RAM). It should be understood that a person skilled in the art will appreciate other buffers 204 that may be used.

Depending on the rate data is received and the rate in which data is removed from buffer 204, the fill level of buffer 204 may vary. If the data is received from network 104 faster than data is removed, then the buffer fill level may increase. If the data from network 104 is received at a slower rate than the rate at which data is removed from buffer 204, the buffer fill level may decrease. If the buffer fill level reaches an overflow or underflow point, there is a chance that an error may occur. For example, data may be lost if the fill level of buffer 204 overflows and additional data cannot be stored in buffer 204 when it is received from network 104. Also, data sent to destination 108 may be corrupted if data is to be removed from buffer 204 when there is no data in buffer 204. If this happens, destination 108, which expects data at a certain bit rate, may experience an error because it expects data always to be flowing in a stream at a certain bit rate.

Accordingly, it is preferred that the egress clock rate generated by programmable clock generator 206 substantially matches the ingress clock rate. However, because the ingress clock rate may be dynamically changing and also jitter may occur while sending data across network 104, the egress clock rate may have to be adjusted. It is desired that the jitter or wander of the egress clock rate is kept to a minimum so as to not affect the synchronization or lock of destination 108. Thus, clock rate control state machine 202 is configured to keep the depth of buffer 204 at a level that may prevent overflows/underflows of buffer 204.

Clock rate control state machine 202 controls the egress clock rate outputted by programmable clock generator 206 based on the fill level of buffer 204. To start the process, clock rate control state machine 202 continuously monitors the fill level of buffer 204 and calculates a seed rate that is used as an egress clock frequency. Clock rate control state machine 202 is configured to calculate a beginning seed rate. In one embodiment, the seed rate may be calculated over a relatively long period of time (seconds) in order to average out any bursty data received from network 104. In one embodiment, a number of valid data bursts that are received are divided by a period of time. In another embodiment, the number of packets received over a fixed time period is counted and then divided by the time it took to receive the packets. This may be performed multiple times in order to determine seed rate samples. A seed rate is then determined to be stable when a current sample is within a small percentage of the previous sample.

Once the seed rate is determined, clock rate control state machine 202 calculates high and low thresholds and an ideal depth for buffer 204. The high and low thresholds represent different fill levels of buffer 204. Also, an ideal depth is a depth at which the fill level of buffer 202 is desired to be maintained. In one embodiment, when the buffer fill level is maintained at the ideal depth, the ingress clock rate is substantially equal to the egress clock rate.

Figure 3:
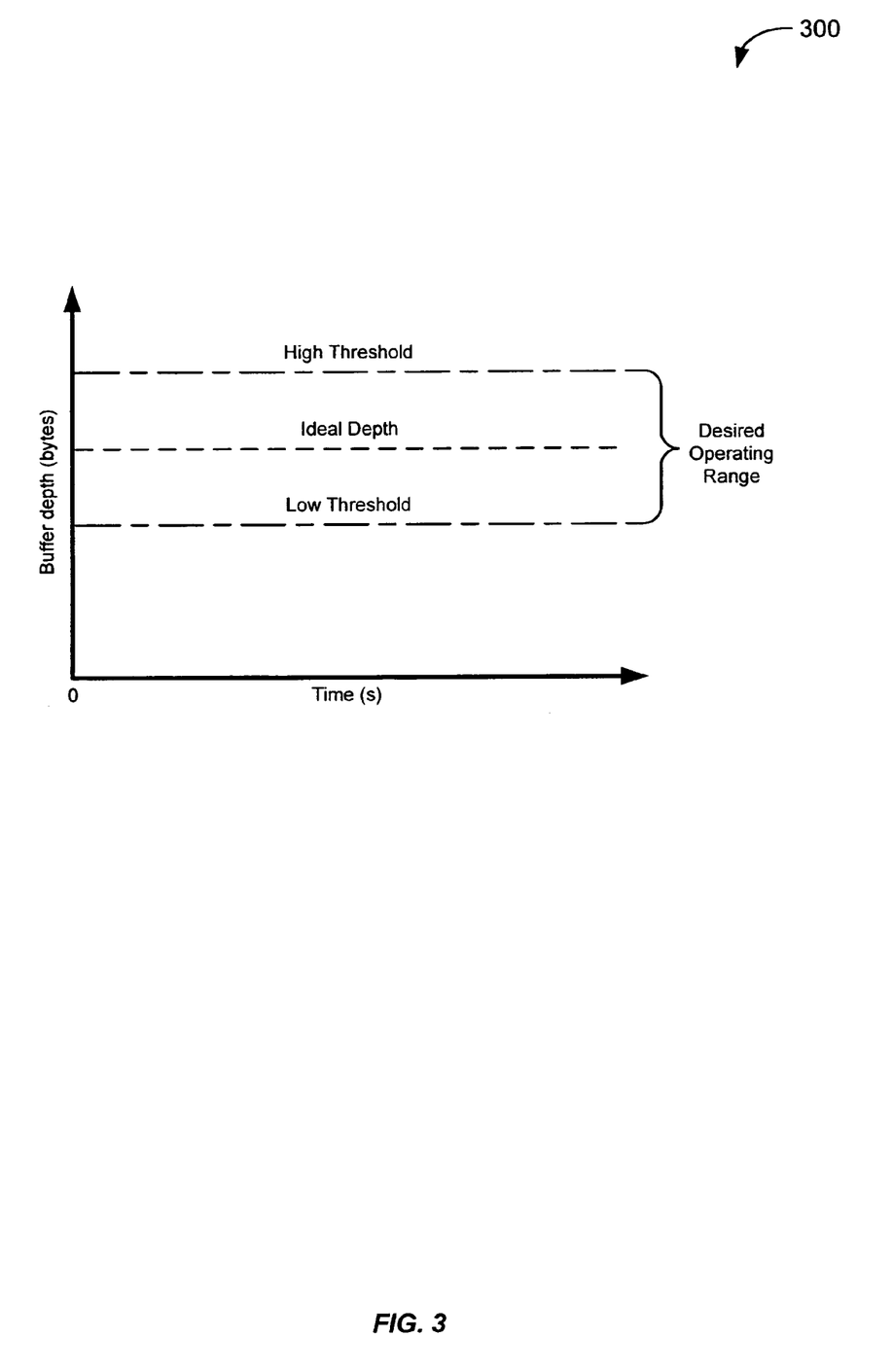
FIG. 3 shows a graph of the high threshold, low threshold, and ideal depth according to one embodiment of the present invention.

FIG. 3 shows a graph 300 of the high threshold, low threshold, and ideal depth according to one embodiment of the present invention. The seed value may be used to calculate the high threshold, low threshold, and ideal depth. As shown, the high threshold is approximately twice the low threshold and the ideal depth is halfway between the high threshold and low threshold. The use of powers of two make the threshold values easy to calculate and the ideal depth is calculated by adding the two values and dividing the sum by two to get the average.

The value of the thresholds are determined using the data rate based on the seed value. The formula used depends on the size of buffer 204 and an acceptable latency of data. In order to prevent thresholds of zero, division by a power of two and a fixed add of an offset prevents thresholds of zero even at low data rates. For example, the formulas low threshold=((seed value÷256)+4) may be used. The high threshold is then calculated as double the low threshold.

Figure 4:
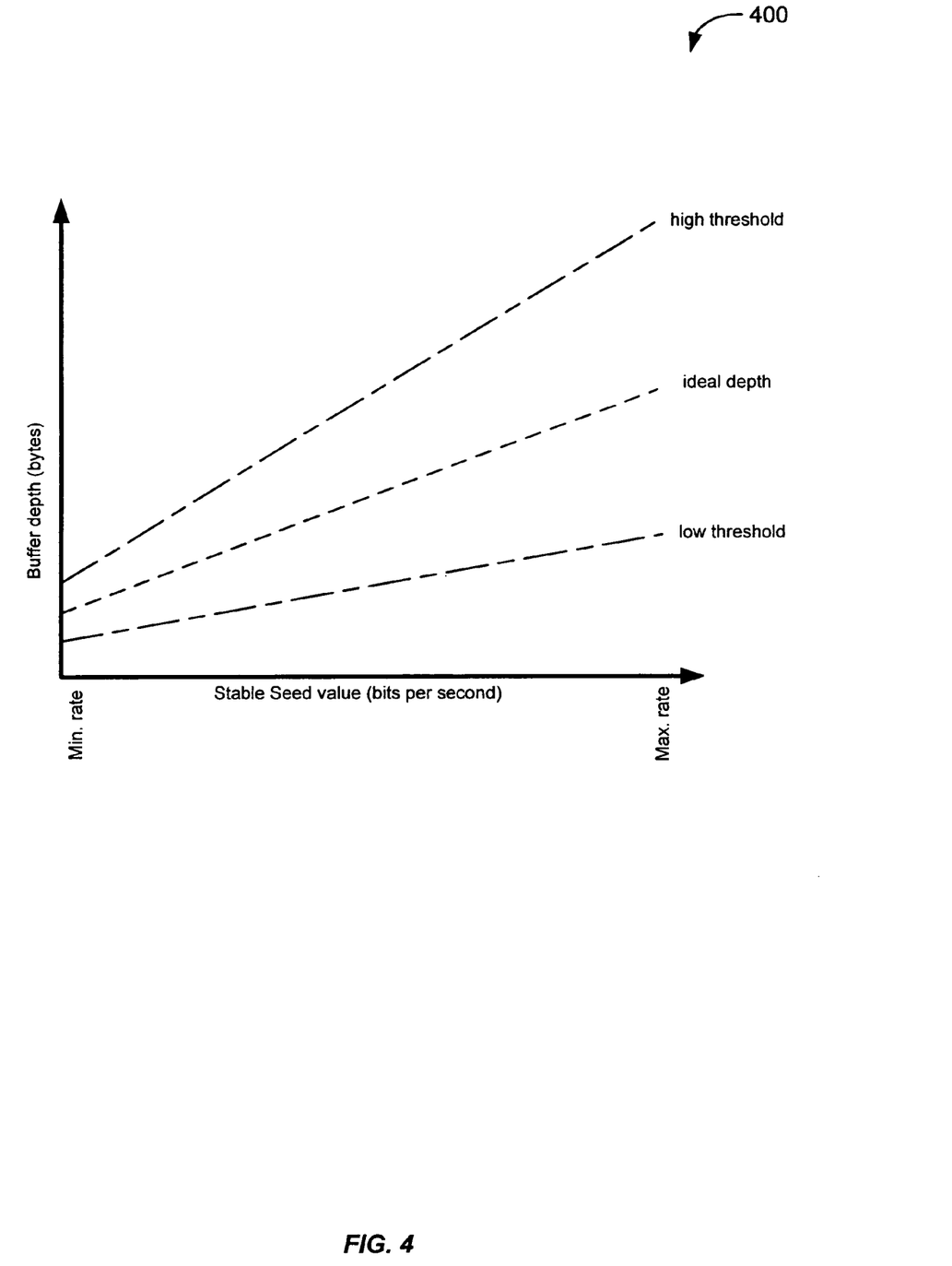
FIG. 4 shows a graph that depicts possible low and high thresholds according to one embodiment of the present invention.

FIG. 4 shows a graph 400 that depicts possible low and high thresholds according to one embodiment of the present invention. As shown, as the seed value increases, the high threshold, low threshold and ideal depth also increase. The values of the high and low thresholds may be limited by the maximum depth of buffer 204; however, for discussion purposes, it will be assumed that the depth is unlimited for buffer 204.

After the thresholds and ideal depth are determined, a coarse frequency adjustment and a fine frequency adjustment are determined. The coarse frequency adjustment is a larger adjustment that is designed to drastically lower or raise the fill level of buffer 204. For example, when the fill level reaches the high threshold or low threshold, there may be a chance that data may be lost or corrupted. For example, if the high threshold is reached, there may not be room in buffer 204 to store new data received from network 104. Also, if the low threshold is reached, there may not be data to send to destination 108 at the correct rate because there may be no data left in buffer 204. Accordingly, the buffer level is either drastically lowered or raised by an adjustment to the seed rate. A drastic rate change, however, may affect the receiver port of destination 108. Destination 108 needs to receive data at clock rate that is stable. If the rate is not stable, then destination 108 may lose its lock on the clock frequency and an error may be caused. Slight variations in the rate that data is sent to destination 108 may occur, however. Also, large variations may occur but should only occur briefly or an error may occur.

Thus, the coarse frequency adjustment is used to adjust the fill level from the high threshold or low threshold to the ideal depth. A fine frequency adjustment is then used to adjust the seed rate permanently for a period of time. When the coarse frequency adjustment causes the fill level to reach the ideal depth, the seed frequency is then increased/decreased by the fine frequency adjustment. The seed rate is left at that frequency until the depth hits the high threshold or low threshold again.

Because a fine frequency adjustment is used, the fill level may hit the high threshold or low threshold again because a smaller rate of adjustment may be used than is necessary. For example, the egress clock rate may be 1000 baud per second (BPS) and the seed rate may be 990 BPS. The fine frequency rate may be 2 BPS. If a larger frequency adjustment is used, such as 20 BPS, this frequency adjustment will overshoot the egress clock frequency and cause the fill level to move in the opposite direction. These overshoots may cause disruptions in sending data to destination 108, and possibly errors. Accordingly, a small fine frequency adjustment is used in order to fine tune the seed rate gradually. This reduces errors and also minimizes the jitter in the data rate data is sent to destination 108. However, multiple adjustments may be required.

Figure 5:
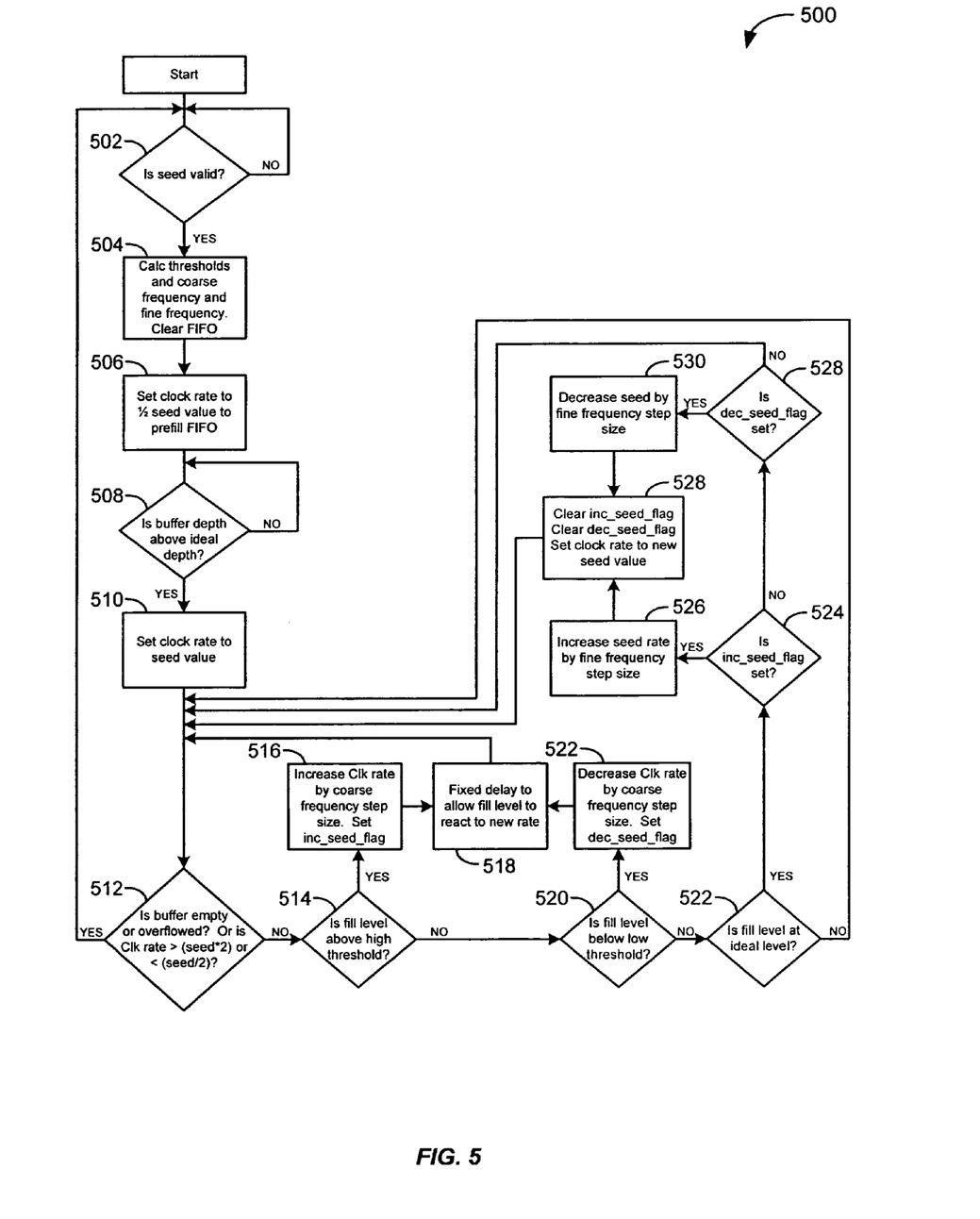
FIG. 5 depicts a simplified flowchart of a method for calculating the ingress clock rate according to one embodiment of the present invention.

FIG. 5 depicts a simplified flowchart 500 of a method for calculating the ingress clock rate according to one embodiment of the present invention. In step 502, it is determined if the seed rate is valid. In determining if the seed rate is valid, clock rate control state machine 202 may determine if the seed rate is stable. For example, the seed rate samples may be determined over a period of time. Once the seed rate is stable, then method may proceed. Because of bursty data that may be received from network 104, it should be determined if the seed rate is valid before determining the egress clock rate.

In step 504, the high threshold, low threshold, and ideal depth are determined along with the coarse frequency and the fine frequency. Additionally, in one embodiment, the buffer 204 may be cleared. The buffer is cleared at this point to rid any erroneous data that may have accumulated because of incorrect egress clock rates. This is a starting point where it is known there is no data in the buffer. This is important because in the next step buffer 204 is pre-filled to the ideal depth. If there is already data in the buffer, pre-filling buffer 204 may result in an overflow. In another embodiment, the data that was already in the buffer is overwritten and not read out of buffer 204.

In step 506, the clock rate outputted by programmable clock generator 206 is set to half of the seed rate value to pre-fill buffer 204. This fills the buffer to an amount that may be close to the ideal depth.

In step 508, it is determined if the buffer depth is above the ideal depth. If it is not, the process reiterates in order to let the level of buffer 204 increase. When the depth of buffer 204 is above the ideal depth, in step 510, the clock rate outputted by programmable clock generator 206 is set to the seed value.

In step 512, provisions are made to exit the operation of the method and to determine a new seed when any of the following four things occur: 1. the buffer becomes empty (depth equals 0); 2. the buffer overflows and the buffer overflows (depth is greater max depth of the buffer); 3. the rate is greater than (seed value times 2); 4. the rate is less than (seed value divided by 2). These provisions are arbitrary and a person skilled in the art will recognize that they may vary. These provisions are determined to allow the rate at source 101 to change dynamically and the egress clock rate can be quickly adjusted to the new rate. For example, the fine frequency adjustments may be too small in order to lock the egress clock rate to the dynamically adjusted ingress clock rate in a certain time period. For example, with a 1000 BPS ingress clock rate, a seed rate of 10 BPS, and a fine frequency adjustment of 2 BPS, it will take many adjustments to increase the seed rate to 1000 BPS. In this case, it would be preferable to recalculate a seed rate over a period of time to determine a more accurate seed rate that is closer to the ingress clock rate. For example, a re-calculated seed rate may be 990 BPS. Thus, a new seed value is calculated that may be closer to the dynamically changed ingress clock rate. This allows the end user of a network to change connecting equipment or change data rates of connecting equipment dynamically without reconfiguring network parameters.

If the seed rate does not need to be calculated again, in step 514, clock rate control state machine 202 determines if the fill level of buffer 204 is above the high threshold. If the fill level is above the high threshold, in step 516, the ingress clock rate is increased by the coarse frequency step size. Also, a flag is set that indicates that the clock rate was increased by the coarse frequency step size; this flag will be referred to as the "inc_seed_flag". This coarse frequency step size is designed to drain buffer 204 at a more drastic rate than that of the seed rate. Accordingly, the fill level may decrease to the ideal depth. In step 518, there is a fixed delay that allows the fill level of the buffer to react to the new rate.

The process then reiterates to step 512 and 514. In step 514, it is determined if the fill level has decreased below the high threshold. If not, in step 516, the ingress clock rate is increased by the coarse frequency step size again. This allows the fill level to be drained in the case where the seed rate is significantly lower than the egress clock rate. In this case, the seed rate may be increased multiple times before the fill level goes below the high threshold.

In step 520, assuming the fill level was not above the high threshold as described above, it is determined if the fill level is below the low threshold. If the fill level is below the low threshold, then in step 522, the ingress clock rate is decreased by the coarse frequency step size. Also, the flag "dec_seed_flag" is set in order to indicate that the clock has been decreased by the coarse frequency step size. In step 518, there is a fixed delay to allow the fill level to react to the new rate.

The process then reiterates to step 512 and 514. In step 504, it is determined if the fill level has increased to be above the low threshold. If not, in step 516, the ingress clock rate is decreased by the coarse frequency step size again. This allows the fill level to be increased in the case where the seed rate is significantly higher than the egress clock rate. In this case, the seed rate may be decreased multiple times before the fill level goes above the low threshold.

After the coarse frequency step size adjustment (when either the low or high threshold was breached in the opposite direction), the fill level reaches the ideal level. This is tested at step 522. If the fill level does not reach the ideal level, then the process reverts back to step 512.

In step 524, when the fill level is past the ideal level, it is then determined if the inc_seed_flag is set. This indicates that the fill level has reached the high threshold and the coarse frequency step size is used to adjust the egress clock rate. In step 526, the egress clock rate is increased by the fine frequency step size. Accordingly, the seed rate is increased a slight amount and set to the egress clock rate. Accordingly, the coarse frequency step size increases to the egress clock rate are removed and a smaller fine frequency step size is used as an increase the egress clock rate. The egress clock rate is thus finely adjusted.

In step 528, the inc_seed_flag and dec_seed_flag is cleared and the egress clock rate is set to the new seed rate. The process then reiterates to step 512. In this case, because the egress clock rate was increased by the fine frequency step size, the fill level may increase towards the high threshold again. However, the increase of the fill level may increase at a rate that was slower than the last rate. This is because the egress clock frequency has been increased and thus it is anticipated that more data may be read from buffer 204 than in the previous cycle. Thus, the increase of the fill level may be less gradual.

Moving back to step 522, if the fill level is at the ideal level, but the inc_seed_flag is not set, it is determined if the dec_seed_flag is set in step 528. This is when the fill level hits the low threshold and the clock rate is decreased by the coarse frequency step size. If the dec_seed_flag is set, in step 530, the seed value is decreased by the fine frequency step size. The process then proceeds to step 528 where the dec_seed_flag is cleared and the egress clock is set to the new seed value. The process reiterates to step 512.

In this case, because the egress clock rate was decreased by the fine frequency step size, the fill level may decrease towards the low threshold again. However, the decrease of the fill level may decrease at a rate that was slower than the last rate. This is because the egress clock frequency has been decreased and thus it is anticipated that less data may be read from buffer 204 than in the previous cycle. Thus, the decrease of the fill level may be less gradual. The process as described above continues.

Figure 6:
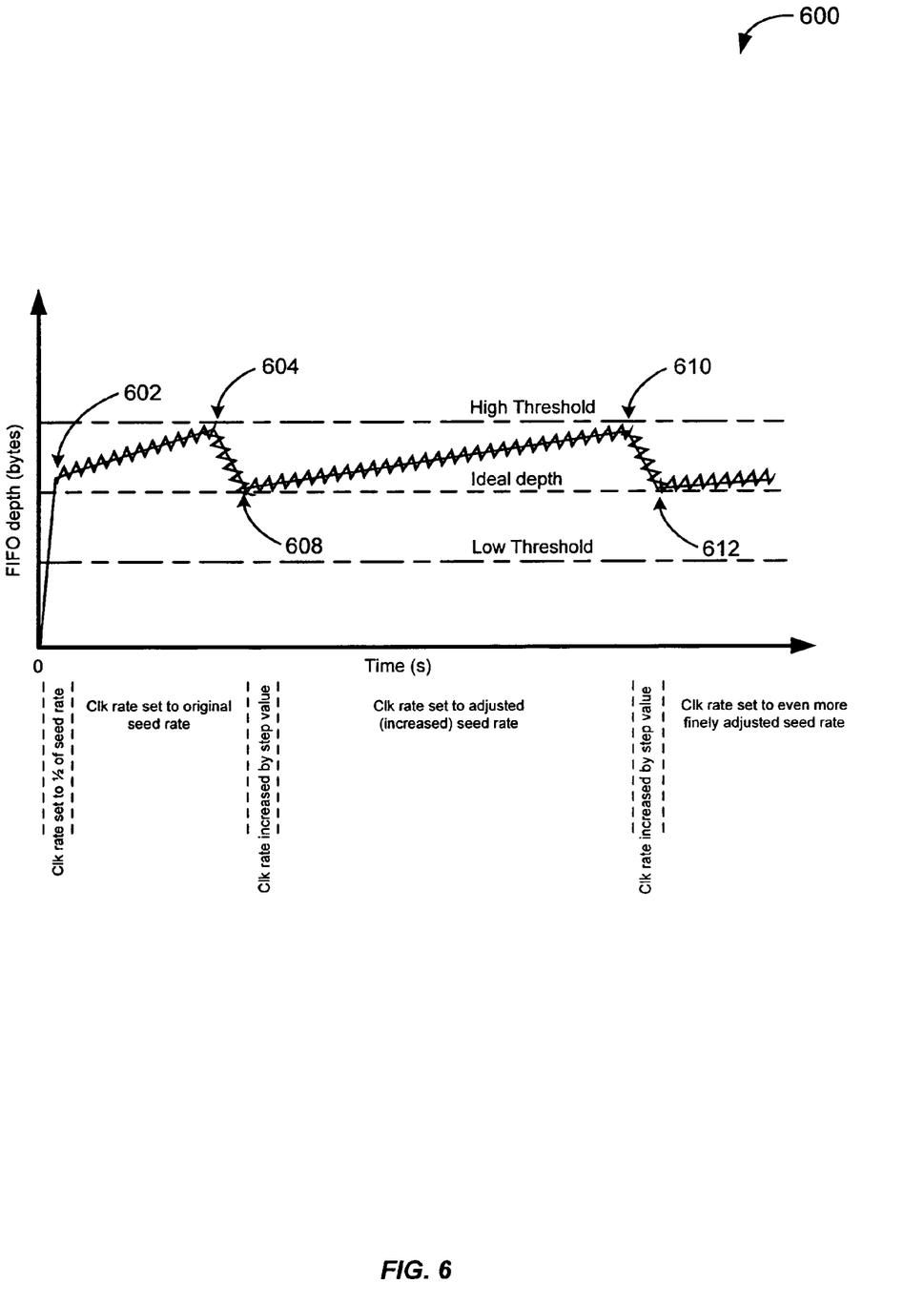
FIG. 6 shows a graph of the buffer fill level as the method of FIG. 5 is performed.

FIG. 6 shows a graph 600 of the buffer fill level as the method of FIG. 5 is performed. As shown, at 602, the fill level of buffer 204 is filled until it hits the ideal depth. Once the ideal depth is hit, the egress clock rate is set to the seed rate. In this example, the seed rate may be too low and thus, packets are received faster than data is removed and sent to destination 108. Accordingly, the fill level of buffer 204 increases. The fill level increases until it hits the high threshold at 604. At this point, the egress clock rate is adjusted by the coarse step size. This is a drastic adjustment that causes the fill level of buffer 204 to decrease faster and it hits the ideal depth at 608.

Then, the seed rate is adjusted by the fine frequency step size and applied to the egress clock rate. In this case, the egress clock rate is not quite equal to the ingress clock rate and thus the fill level increases again. However, the fill level increases at an angle that is less than the angle found from point 602 to 604. At 610, the fill level hits the high threshold again. The coarse frequency step size adjustment is applied to the egress clock rate and the fill level decreases until it hits the ideal depth again at 612. When this happens, the seed rate is adjusted by the fine frequency step size and applied to the egress clock rate. Now, the fill level may increase at an even slower rate than from point 608 to 610. This process continues until the seed rate substantially matches the ingress clock rate.

The above process provides many advantages. By increasing/decreasing the egress clock rate using the coarse frequency step size, this prevents buffer 204 from over/underflowing. Accordingly, this avoids any data loss and data corruption. The fine frequency adjustment is then made. Because the fine adjustment may be too small an adjustment, the fill level may hit the high threshold/low threshold again. When this happens, a drastic adjustment is made and then the fine frequency adjustment is made again when the ideal depth is reached. The continual fine tuning may cause the depth of buffer 204 to deviate from the ideal depth more slowly after each adjustment and thus, it may be a longer time before the high/low thresholds are crossed again. Eventually, the egress clock rate will be assigned a value that substantially matches the ingress clock rate. This clock rate is the desired clock rate for operation for system 100.

By adjusting the frequency gradually using a coarse frequency adjustment and fine frequency adjustment, over/underflows are avoided and the lock may be maintained with destination 108. Preventing overflows and underflows is important to prevent the loss of data due to buffer over/underflow. The loss of data is prevented by quickly reacting to the high threshold and low thresholds being violated by using the coarse adjustment. A possible adverse effect of using the coarse adjustment is that it causes large amounts of jitter on the egress port and may cause destination 108 to lose its lock. The coarse adjustment is a temporary change to the clock rate that allows the state machine 202 to fine-tune the egress clock rate without losing data.

Embodiments of the present invention also minimize the number of adjustments to the egress clock and ultimately the jitter on the egress clock. There may be many coarse adjustments when the process is first started and the egress clock is fine tuned. Once the seed is adequately accurate, the coarse adjustments may not be needed for long periods of time. Once in this steady state, the adjustments are nearly eliminated and therefore the jitter is minimized to be the intrinsic jitter of the programmable clock generator.

An example will now be described. In one embodiment, an actual ingress clock rate may be 1,000 bps. The initial seed rate as calculated by counting data coming out of buffer 204 from a known period of time may be calculated as 994 bps. Accordingly, the low threshold may be calculated using ((initial seed value/256)+4)=((994/256)+4)=8 bytes (rounded up). The high threshold is calculated as a low threshold×2=8×2=16 bytes. The ideal depth is calculated as (high threshold+low threshold)/2=(8+16)/2=12 bytes. The fine adjustment may 1 bps and the coarse frequency adjustment may be 4 bps. These values may be determined from a lookup table or calculated based on the seed value determined.

Once the seed rate is stable and the above thresholds are calculated, the following may be performed. The egress clock rate may be set to half of the initial seed rate, which is 994/2=497 bps. Buffer 204 is then cleared of all preexisting data such that the buffer depth equals 0 bytes. Once the depth of buffer 204 fills up to be greater than the ideal depth (10-12 bytes), the egress clock rate is set to the seed value of 994 bps. Because 994 bps is too low of a clock rate (it should actually be 1,000 bps), the fill level of buffer 204 continues to fill up and eventually hits the high threshold (16 bytes). The egress clock rate is adjusted by the coarse frequency step size (current clock rate+4 bps)=990 bps.

Because 990 bps is still too low of a clock rate, the fill level of buffer 204 continues to fill up, and the high threshold is still violated. In this case, instead of the fill level immediately decreasing, the fill level still increases above the high threshold. Because the high threshold is still violated, the egress clock rate is adjusted again by the coarse frequency step size (current clock rate+4 bps)=1,002 bps. Because 1,002 bps is now too high of a rate, (greater than 1,000 bps), the fill level of buffer 204 starts to drain but may not drop below the high threshold yet. Thus, the clock frequency is adjusted again by the coarse frequency step size (current clock rate+4 bps)=1,006 bps. Now the fill level of buffer 204 turns and the depth drops below the high threshold. Thus, the clock rate stays at 1,006 bps until the ideal depth is reached (12 bytes).

When the ideal depth is reached, the seed rate is adjusted by the fine frequency step size (994+1=995 bps). Because the fill level is at the ideal depth, the egress clock frequency is set to the new seed rate (995 bps). The fill level then fills up because the egress clock rate is too low. The process continues as discussed above until the seed value is assigned the rate of 1,000 bps. At this point, the egress clock rate substantially matches the ingress clock rate and the fill level may remain at the ideal level subject to any bursty variations from data received from network 104.

The present invention can be implemented in the form of control logic in software or hardware or a combination of both. The control logic may be stored in an information storage medium as a plurality of instructions adapted to direct an information processing device to perform a set of steps disclosed in embodiment of the present invention. Based on the disclosure and teachings provided herein, a person of ordinary skill in the art will appreciate other ways and/or methods to implement the present invention.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method for calculating a clock rate for a serial clock of a transmitter, wherein data sent from the transmitter is sent over an asynchronous network, the method comprising:
    monitoring a fill level of a buffer for a period of time;
    calculating a seed frequency for an initial clock rate of the serial clock during the period of time;
    sampling the seed frequency to determine when the seed frequency is stable;
    calculating first and second amounts based on the seed frequency when it is determined that the seed frequency is stable;
    removing all data from the buffer;
    receiving data over the asynchronous network;
    storing the data in the buffer at a clock rate that corresponds to the seed frequency;
    monitoring the fill level of the buffer such that when the fill level of the buffer exceeds a threshold in a first direction, changing the seed frequency by the first amount in order to cause the fill level to exceed the threshold in a second direction; and
    when the fill level exceeds the threshold in the second direction, adjusting the seed frequency by the second amount configured to allow for multiple adjustments to the seed frequency until the seed frequency is substantially similar to the clock rate of the serial clock, wherein the first amount is larger than the second amount.

2. The method of claim 1, wherein the threshold comprises a high threshold and the buffer fill level increases past the high threshold.

3. The method of claim 2, wherein changing the seed frequency by the first amount comprises increasing the seed frequency by the first amount.

4. The method of claim 3, further comprising changing the seed frequency by the first amount multiple times until the buffer fill level exceeds the high threshold in the second direction.

5. The method of claim 1, wherein the threshold comprises a low threshold and the buffer fill level decreases past the low threshold.

6. The method of claim 5, wherein changing the seed frequency by the first amount comprises decreasing the seed frequency by the first amount.

7. The method of claim 6, further comprising changing the seed frequency by the first amount multiple times until the buffer fill level exceeds the low threshold in the second direction.

8. The method of claim 1, wherein the network comprises a TDM network or packet-based network.

9. A method for calculating a clock rate for a serial clock of a transmitter, wherein data sent from the transmitter is sent over an asynchronous network, the method comprising:
    monitoring data sent over the network for a period of time;
    calculating an initial seed frequency for the serial clock based on the data monitoring;
    determining a high threshold, a low threshold, an ideal depth of a buffer, a coarse frequency adjustment value, and a fine frequency adjustment value based upon the calculated seed frequency;
    emptying a buffer configured to receive data from the transmitter when the high threshold, low threshold, ideal depth, coarse frequency adjustment, and fine frequency adjustment are determined;
    receiving data from the transmitter over the asynchronous network;
    storing the data in the buffer;
    monitoring the fill level of the buffer;
    determining if the fill level of the buffer exceeds the high threshold or low threshold;
    if the level of the buffer exceeds the high threshold, then performing the steps of:
    setting a first new seed frequency as the seed frequency plus the coarse frequency adjustment;
    when the level of the buffer reaches the ideal depth of the buffer, setting a second new seed frequency as the seed frequency plus the fine frequency adjustment, wherein the second new seed frequency is less than the first new seed frequency;
    if the level of the buffer exceeds the low threshold, then performing the steps of:
    setting a first seed frequency as the seed frequency minus the coarse frequency adjustment;
    when the level of the buffer reaches the ideal depth of the buffer, setting a second new seed frequency as the seed frequency minus the fine frequency adjustment, wherein the second new seed frequency is greater than the first new seed frequency.

10. The method of claim 9, wherein the fine frequency adjustment value is a value that does not change the seed frequency such that it will not cross the high threshold or low threshold again after one adjustment.

11. The method of claim 9, further comprising setting the first seed frequency as the first new seed frequency plus the coarse frequency adjustment if the fill level of the buffer continues to exceed the high threshold.

12. The method of claim 9, further comprising setting the first seed frequency as the first new seed frequency minus the coarse frequency adjustment if the level of the fill buffer continues to exceed the low threshold.

13. The method of claim 9, wherein the network comprises a TDM network or packet-based network.

14. The method of claim 9, wherein determining the coarse frequency adjustment value further comprises accessing data in a lookup table based upon the initial seed frequency.

15. The method of claim 1, wherein the seed frequency is determined to be stable when a current value of the seed frequency is within a predetermined amount of a previous value of the seed frequency.

* * * * *

UNITED STATES PATENT AND TRADEMARK OFFICE
CERTIFICATE OF CORRECTION

PATENT NO. : 7,646,836 B1 Page 1 of 1
APPLICATION NO. : 11/153654
DATED : January 12, 2010
INVENTOR(S) : Russell Mays It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 731 days.

Signed and Sealed this

Sixteenth Day of November, 2010

David J. Kappos
*Director of the United States Patent and Trademark Office*